Patented July 29, 1952

2,605,253

UNITED STATES PATENT OFFICE 2,605,253

UREA RESINS CONTAINING DIMETHYLAMINO SUBSTITUENTS

Robert W. Auten, Jenkintown, and Vincent C. Meunier, Flourtown, Pa., assignors to Rohm & Haas Company, Philadelphia, Pa., a corporation of Delaware No Drawing. Application December 16, 1950, Serial No. 201,245

2 Claims. (Cl. 260—70)

This invention relates to a new class of nitrogenous, thermosetting resins and to the process by which they are prepared. The products of this invention are cationic, nitrogenous, hydrophilic resins caracterized by high solubility in water, even when very highly condensed; and they are, therefore, particularly valuable in operations requiring very dilute solutions of resins as, for example, in the treatment of fabrics and in the manufacture of paper products.

These improved products are made by co-reacting urea, formaldehyde, and dimethylamine. While these are the essential reactants, it is to be understood that some of the urea can be replaced if desired by other reagents such as thiourea, guanidine, and monoacyl, monoalkyl, and monoaryl ureas. Also, while it is preferred to employ the formaldehyde as a solution such as formalin, it may also be used in its polymeric forms such as paraformaldehyde.

The ratio of the three essential reactants can be varied within reasonable limits depending upon the type of product desired. Each reagent, as well as the amount used thereof, contributes to the properties of the final product. For example, the ratio of aldehyde to urea is of major importance. While a range of two to three moles of formaldehyde per mole of urea is operable in the process of this invention, a preferred range which gives better results is from about 2.4 to about 2.6 moles of aldehyde per mole of urea.

Of equal importance is the amount of dimethylamine which is used to form the resin since it is the co-reaction of this amine which imparts the cationic charge to the molecules of resin. While it is theoretically possible to react as much as one molecule of dimethylamine per methylol group; i. e., for each mole of reacted formaldehyde, it is preferred that a much lower ratio be used. The lower limit of the amount of dimethylamine which can be used is 0.05 mole per mole of urea and the practical upper limit is 0.5 mole per mole of urea. A preferred range which has been most satisfactory is from 0.1 to 0.4 mole per mole of urea.

In the preparation of the resinous products of this invention an aqueous solution of urea, formaldehyde, and dimethylamine having a pH of 1.5 to 10 is heated at a temperature from about 40° C., or preferably 60° C., to the boiling point of the solution until the product has a viscosity of at least 0.5 poise when measured as a 50% aqueous solution at 25° C. Since the condensation reaction proceeds more rapidly as the temperature is raised or as the pH of the solution is lowered, it is advisable to balance these factors for the sake of economy in operation. That is to say, when high pH values of the order of 9 to 10 are employed, the temperature should be raised in order to accelerate the reaction.

The preferred procedure comprises, first, heating an aqueous solution of the urea, formaldehyde, and dimethylamine under substantially neutral conditions or under alkaline conditions (pH of 7.0 to 10.0) for a relatively short period during which the three reactants combine to form a product of comparatively low molecular weight. For example, under neutral conditions a period of fifteen minutes at about 60° C. followed by a period of refluxing assures that the three reactants combine. Under these neutral or alkaline conditions such a heat-treatment is not strenuous enough to cause the urea and formaldehyde to polymerize before the dimethylamine reacts. A longer period of heating can be employed but to no particular advantage since all that is desired at this point is that the three reactants combine chemically; and this combination does occur in about an hour or less at temperatures above about 60° C.

In the next step the mixture is acidified and polymerized. The polymerization of the reaction mixture can be conducted and controlled at a pH as low as 1.5; but for commercial operation a pH of 5.0 to about 6.8 is preferred, especially when elevated temperatures are employed and the concentration of the aqueous reaction mixture is 50% or over. While the polymerization takes place at room temperature (about 20° C.) over a period of days and while a perfectly satisfactory product is thus prepared, it is preferred that higher temperatures; i. e., those from 60° C. to the boiling point of the aqueous reaction mixture, be used. Within the preferred pH range of 5.0 to 6.8 the aqueous mixture can be safely heated at refluxing temperature. As to the effect of concentration, it can be said that the rate of polymerization varies directly with the concentration and is faster at higher concentrations. The concentration can be varied conveniently from 30% to 80% by the addition of water or by its removal by distillation.

The reaction can be carried to any desired end-point, depending upon the intended use of the resinous product. As the reaction continues, the viscosity of the reaction mixture gradually increases. The viscosity, therefore, is a valuable index of the extent of reaction and the resin is ordinarily condensed until a 50% solution of it in water has a viscosity above 0.5 poise at 25° C.

A viscosity of about one to six poises is preferred, particularly when the resin is to be used for impregnating purposes.

The products of this invention are considered to have infinite solubility in water. They also carry a cationic charge and they cure rapidly to an insoluble and infusible condition when applied to paper or cloth and heated to temperatures above about 100° C. The resins can be used in solution or can be concentrated or dried. Drying can be accomplished by conventional methods such as heating under vacuum, drum-drying, or spray-drying. Since the products are thermosetting, care must be exercised during the drying to prevent conversion of the resins to an insoluble and infusible condition.

The following example serves to illustrate how the products of this invention are made.

*Example*

Into a five-liter, three-necked flask, equipped with mechanical agitator, thermometer, and reflux condenser fitted with a water-separator, were charged 2870 grams of a 36.6% aqueous solution of formaldehyde (35 moles HCHO) and 504 grams of a 25% aqueous solution of dimethylamine (2.8 moles $(CH_3)_2NH$). The solution was adjusted to a pH of 7.6 by the addition of 230 cc. of a 37% aqueous solution of hydrochloric acid. Then 840 grams of urea (14 moles) was added and the resultant mixture was heated to 80° C. and held there for 15 minutes. Then the solution was heated to refluxing temperature (101°–102° C.) and held for thirty minutes. At this point the pH of the solution was adjusted to 6.5 by the addition of hydrochloric acid. The solution was heated at its boiling point while water was continuously removed. A total of 1070 grams of distillate was collected. (It is advantageous at this point to remove sufficient water to bring the solids-content of the solution within the range of 40%–50%.) The temperature of the reaction mixture was then lowered to 90°–93° C. During the distillation step the pH of the solution had fallen to 5.3 and the solution had reached a viscosity of 1.25 poises. The pH was raised to 5.4–5.8 by the addition of 5 cc. of a 25% aqueous solution of sodium hydroxide. This pH was maintained while the reaction mixture was held at 90°–93° C. for 5.5 hours. The product was cooled to room temperature and was found to have a viscosity of 4.7 poises (25° C.). The pH of the product was adjusted to 7.1 with a dilute solution of sodium hydroxide. The final solution, after filtration, was infinitely dilutable with water at 25° C. and remained unchanged on cooling to 5° C., event when diluted to a solids-content of 10%.

The products of this invention are particularly valuable in the preparation of special kinds of paper, such as paper of high wet-strength. In that operation, full advantage may be taken of the unusual physical and chemical properties of the resins. Thus, their extreme solubility permits their use at the wet end of the paper machine in the beater, head box, or machine chest where the resins remain in solution even in the extremely dilute aqueous mixtures used in paper-making. Furthermore, because of their cationic charge, these resins are sorbed to a much greater extent by the negatively charged cellulose than are ordinary urea-formaldehyde resins.

The products of this invention may also be used as casting and laminating resins alone or in conjunction with plasticizers, pigments, inert extenders, fillers, starch, cereal flours, and wood flour.

We claim:

1. As a new composition of matter, a water-soluble thermosetting resinous product having a viscosity of at least 0.5 poise when measured as a 50% aqueous solution at 25° C. obtained by chemically reacting as the essential reactants urea, formaldehyde, and dimethylamine in aqueous solution at a pH of 7 to 10 and at a temperature from about 60° C. to the boiling point of the solution, and then polymerizing the resultant mixture at a temperature from about 60° C. to the refluxing temperature at a pH from about 1.5 to about 6.8, the formaldehyde being reacted in an amount from 2.0 to 3.0 moles per mole of urea and the dimethylamine being reacted in an amount from 0.05 to 0.5 mole per mole of urea.

2. As a new composition of matter, a water-soluble thermosetting resinous product having a viscosity of from 1 to 6 poises when measured as a 50% aqueous solution at 25° C. obtained by chemically reacting as the essential reactants urea, formaldehyde, and dimethylamine in aqueous solution at a pH of 7 to 10 and at a temperature from about 60° C. to the boiling point of the solution, and then polymerizing the resultant mixture at a temperature from about 60° C. to the refluxing temperature at a pH from about 5.0 to about 6.8, the formaldehyde being reacted in an amount from 2.4 to 2.6 moles per mole of urea and the dimethylamine being reacted in an amount from 0.1 to 0.4 mole per mole of urea.

ROBERT W. AUTEN.
VINCENT C. MEUNIER.

REFERENCES CITED

The following references are of record in the file of this patent:

UNITED STATES PATENTS

| Number | Name | Date |
|---|---|---|
| 2,286,752 | Mighton | June 16, 1942 |
| 2,300,367 | Hormon | Oct. 27, 1942 |
| 2,325,375 | D'Alelio | July 27, 1943 |
| 2,529,142 | Dudley | Nov. 7, 1950 |